Patented Aug. 11, 1953

2,648,657

UNITED STATES PATENT OFFICE 2,648,657

EMULSION POLYMERIZATION OF UNSATURATED ORGANIC COMPOUNDS

Edwin J. Vandenberg, Wilmington, Del., assignor to Hercules Powder Company, Wilmington, Del., a corporation of Delaware No Drawing. Application April 12, 1947, Serial No. 740,999

20 Claims. (Cl. 260—84.1)

This invention relates to an improved process for the emulsion polymerization of unsaturated organic compounds and more particularly to an improved process of polymerizing vinyl, vinylidene, and vinylene compounds to provide synthetic rubberlike materials.

It is well known that unsaturated organic compounds, particularly those containing the vinyl group, may be advantageously polymerized in aqueous emulsion. Through use of the emulsion technique synthetic rubberlike materials have been prepared by polymerizing diolefins, halogen derivatives of diolefins, or other substituted diolefins or by interpolymerizing diolefins with other compounds containing a vinyl group such as styrene, acrylic acid esters, and acrylonitrile. Polymers such as polyvinyl halides, polyvinyl acetate, polystyrene, polymethyl methacrylate, and various other addition polymers also have been prepared by polymerization in aqueous emulsion. Soaps of fatty acids commonly have been used as emulsifying agents for polymerizations of this type.

The alkali metal salts of modified rosins and of modified rosin acids such as dehydroabietic, dihydroabietic, and tetrahydroabietic acids have been used satisfactorily as emulsifying agents in the preparation of polymers by emulsion polymerization, but it has not been possible prior to the process in accordance with this invention to use as emulsifying agents the alkali metal salts of natural rosins or of such acids as abietic acid contained therein without resorting to the use of excessive temperatures and amounts of catalyst. The presence of abietic acid, for example, in amounts up to about 2% in an otherwise satisfactory emulsifying agent has resulted in retardation of the polymerization, and amounts of abietic acid above 2% have resulted in definite inhibition of such polymerizations. Prior to the present process, in other words, it has not been generally possible to utilize abietic and similar natural rosin acids or natural rosins containing preponderant amounts of such acids as emulsifying agents in the polymerization of vinyl, vinylidene, and vinylene compounds.

Now in accordance with this invention it has been found that the alkali metal salts of abietic and similar natural rosin acids and of natural rosins containing substantial amounts of these acids may be successfully used as emulsifying agents in the emulsion polymerization of organic compounds containing the $CH_2=C<$ group by carrying out the polymerization in the presence of a catalyst comprising a tertiary organic hydroperoxide having more than five carbon atoms, an activator comprising a water-soluble heavy metal salt and an $\alpha$-hydroxycarbonyl compound, and an emulsifying agent comprising an alkali metal salt of a $C_{20}H_{30}O_2$ rosin acid. By the process in accordance with this invention the polymerization of vinyl, vinylidene, and vinylene compounds may be effected within reasonable lengths of time with the attainment of satisfactory yields of polymers.

In carrying out the process in accordance with this invention the polymerization of vinyl, vinylidene, and vinylene compounds is effected in the usual manner utilizing the well-known emulsion technique. However, the polymerization is effected in the presence of an alkali metal salt of a $C_{20}H_{30}O_2$ rosin acid as the emulsifying agent, and the catalyst utilized constitutes a tertiary organic hydroperoxide having more than five carbon atoms. There also is used an activator comprising a water-soluble heavy metal salt and an $\alpha$-hydroxycarbonyl compound such as a reducing sugar.

The following examples are illustrative of the preparation of polymers by emulsion polymerization and the products thereof in accordance with this invention. All parts given in the examples represent parts by weight.

EXAMPLE 1

A glass polymerization vessel was charged with 5.0 parts of the sodium salt of commercial abietic acid, 0.51 part of $\alpha,\alpha$-dimethylbenzyl hydroperoxide, 0.5 part of fructose, 161.6 parts of water and 20.0 parts of an activating salt solution, each 1.0 part of activating salt solution containing 0.075 part of sodium pyrophosphate decahydrate, 0.0042 part of ferric sulfate nonahydrate, 0.00019 part of cobaltous chloride hexahydrate and 0.92 part of distilled water. The polymerization vessel then was charged with 25.0 parts of styrene, 75.0 parts of butadiene-1,3 and 0.5 part of the mixture of primary mercaptans derived from Lorol, which is a commercial product containing primarily lauryl alcohol but also some higher and lower aliphatic alcohols. The vessel was sealed, and its contents then were agitated at a temperature of 40° C. for 7.0 hours. At the end of this time the resulting emulsion was run into an open vessel containing 50 parts of a 2% aqueous suspension of phenyl-$\beta$-naphthylamine and 10 parts of a 2% aqueous hydroquinone solution, stripped of the excess butadiene and precipitated by the addition of about 400 parts of a solution containing 700 parts of sodium chloride and about 46 parts of concentrated sulfuric acid dissolved in about 2000 parts of water. The precipitated copolymer was thoroughly washed with water until free of acid, then dried to constant weight. After correcting the total yield to allow for nonpolymer solids it was found that the actual conversion of monomers to copolymer was 72%.

EXAMPLE 2

The process of Example 1 was duplicated with the exception that the sodium salts of other natural rosin acid materials were substituted as emulsifying agents for the sodium salt of commercial abietic acid. The results of these polymerizations are given in Table I.

*Table I*

| Emulsifying Agent (as Sodium Salt) | Reaction Time (Hours) | Conversion (Percent) |
|---|---|---|
| 1. WG Wood rosin | 8.0 | 72 |
| 2. K Wood rosin | 8.5 | 72 |
| 3. I Wood rosin | 8.1 | 72 |
| 4. FF Wood rosin | 9.3 | 72 |

EXAMPLE 3

A glass polymerization vessel was charged with 5.0 parts of the sodium salt of K wood rosin, 0.51 part of $\alpha,\alpha$-dimethylbenzyl hydroperoxide, 0.5 part of fructose, 161.6 parts of water and 20.0 parts of an activating salt solution, each 1.0 part of the solution containing 0.075 part of sodium pyrophosphate decahydrate, 0.0042 part of ferric sulfate nonahydrate and 0.92 part of distilled water. The polymerization vessel then was charged with 25.0 parts of styrene, 75.0 parts of butadiene-1,3 and 0.3 part of the mercaptan mixture of Example 1. The vessel was sealed, its contents agitated at 40° C. for 8.8 hours, and the resulting emulsion worked up as in Example 1. It was found that the conversion of monomers to copolymer was 72%.

EXAMPLE 4

The general procedure of Example 3 was followed using as emulsifying agent the sodium salt of the crude rosin obtained by extracting pine wood with benzene to give a solution of rosin, turpentine, pine oil and benzene, and removing the volatile components of the solution by reduced pressure distillation to give a residue of the crude rosin. The only other variation from the process of Example 3 was in the use of 1.0 part instead of the 0.51 part of $\alpha,\alpha$-dimethylbenzyl hydroperoxide. At the end of 10.3 hours the conversion of monomers to the butadiene-styrene copolymer was 62%.

EXAMPLE 5

The method of Example 3 was repeated using the sodium salts of WG gum rosin and K gum rosin as emulsifying agents, and 0.5 part of the mercaptan mixture as modifying agent in each instance. Both polymerizations were carried out for 9.3 hours, and each resulted in a 72% conversion of monomers to copolymer.

EXAMPLE 6

A glass polymerization vessel was charged with 5.0 parts of the sodium salt of I wood rosin, 0.51 part of $\alpha,\alpha$-dimethylbenzyl hydroperoxide, 0.5 part of fructose, 161.6 parts of water, 20.0 parts of the activating salt solution of Example 3, 25.0 parts of styrene, 75.0 parts of butadiene-1,3 and 0.5 part of the mercaptan mixture of Example 1. The vessel was sealed, its contents agitated at 40° C. for 7.8 hours, and the resulting emulsion worked up as in Example 1. There was obtained a butadiene-styrene copolymer in an amount representing a 72% conversion of the monomers.

The above polymerization was essentially duplicated with the exception of some variations in regard to the particular reducing sugar used, the amount of the sugar, the amount of mercaptan modifier and the temperature of polymerization. The pertinent data are summarized in Table II.

*Table II*

| Sugar | Mercaptan (Parts) | Temperature (° C.) | Reaction Time (Hours) | Conversion (Percent) |
|---|---|---|---|---|
| 1. Glucose (1.0 part) | 0.5 | 40 | 25 | 82 |
| 2. Invert sugar (0.1 part) | 0.4 | 50 | 15.3 | 74 |
| 3. Invert sugar (0.2 part) | 0.4 | 50 | 9.2 | 75 |
| 4. Invert sugar (0.5 part) | 0.4 | 50 | 4.5 | 72 |
| 5. Fructose (0.5 part) | 0.4 | 50 | 3.5 | 69 |
| 6. Lactose (1.0 part) | 0.5 | 40 | 24 | 76 |

EXAMPLE 7

The process of Example 6 was duplicated except for the use of 100.0 parts of butadiene-1,3 in place of the mixture of butadiene-1,3 and styrene, the use of invert sugar instead of fructose, 0.4 part instead of 0.5 part of the mercaptan modifier, and a temperature of 50° C. instead of 40° C. At the end of 7.0 hours the conversion of monomer to polymer was 68%.

Both styrene and methyl methacrylate were polymerized under identical conditions with the exception that the mercaptan modifier was omitted. After 3.0 hours the conversion of styrene to polystyrene was 92%. In the methyl methacrylate polymerization the conversion to polymethyl methacrylate was 46% at the end of 5.0 hours.

EXAMPLE 8

A glass polymerization vessel was charged with 5.0 parts of the sodium salt of I wood rosin and 161.6 parts of water. To the resulting solution was added 0.71 part (7.6% active oxygen) of a commercial hydroperoxide mixture containing 1,2-dimethylcyclopentyl, 1,3-dimethylcyclopentyl, methylcyclohexyl, dimethylcyclohexyl and some heptyl and octyl hydroperoxides, 80% of the hydroperoxides of this mixture being naphthenic, 80% of the hydroperoxy groups being attached to tertiary carbon atoms, and the ratio of $C_7$ to $C_8$ components being 2:1. There then were added 0.5 part of fructose and 20.0 parts of an activating salt solution containing 1.5 parts of sodium pyrophosphate decahydrate, 0.0084 part of ferric sulfate nonahydrate and 18.4 parts of distilled water. The polymerization vessel next was charged with 25.0 parts of styrene, 75.0 parts of butadiene and 0.4 part of the mercaptan mixture of Example 1. The vessel was sealed, its contents agitated at 40°

C. for 9.7 hours, and the resulting emulsion worked up according to the procedure of Example 1. There was obtained a butadiene-styrene copolymer in an amount representing a 72% conversion of the monomers.

EXAMPLE 9

The procedure of Example 6 was duplicated with the exception that catalysts other than the $\alpha,\alpha$-dimethylbenzyl hydroperoxide were used. When 0.82 part of $\alpha,\alpha$-dimethyl-3,5-diisopropylbenzyl hydroperoxide was utilized, a 97% conversion to a butadiene-styrene copolymer was obtained in 24 hours. The use of 0.39 part of triethylmethyl hydroperoxide (3-ethylamyl 3-hydroperoxide) gave a conversion of 71% in 10.2 hours.

EXAMPLE 10

The procedure of Example 6 was followed with the exception that 0.1 part of ascorbic acid was substituted for the 0.5 part of fructose. There was obtained a 59% conversion of monomers to copolymer in 25 hours polymerization time. Likewise, the substitution of 0.5 part of acetylacetone for the fructose led to a 49% conversion in 16.4 hours.

The process in accordance with this invention is carried out in the presence of an emulsifying agent which is an alkali metal salt of a $C_{20}H_{30}O_2$ rosin acid. Exemplary of such acids are abietic, neoabietic, levopimaric, dextropimaric, and isodextropimaric acids. The acids themselves may be used in the form of their alkali metal salts as the emulsifying agents in accordance with this invention although, as shown by most of the examples, there may be used natural rosin materials containing a preponderance of such acids. From the standpoint of economy and convenience it is more advantageous to use the natural rosin material containing the $C_{20}H_{30}O_2$ rosin acids. The rosin acid portion of tall oil also may be utilized as a source of the $C_{20}H_{30}O_2$ rosin acids. The alkali metal salts are prepared by neutralization of the $C_{20}H_{30}O_2$ rosin acids with an alkali metal compound basic in characteristics, such as the hydroxides and carbonates of sodium and potassium. The concentration of the emulsifying agent; namely, the alkali metal salt of a $C_{20}H_{30}O_2$ rosin acid, during the polymerization may be from about 1 to about 5%, preferably from about 2 to about 3% in the aqueous phase. Based on the amount of monomers present the amount of emulsifying agent may be from about 1.5 to about 10%, preferably from about 4 to about 6%.

The catalysts which are operable in the polymerization process of this invention have been illustrated in the examples by $\alpha,\alpha$-dimethylbenzyl hydroperoxide, $\alpha,\alpha$-dimethyl-3,5-diisopropylbenzyl hydroperoxide, triethylmethyl hydroperoxide, and the commercial hydroperoxide mixture containing 1,2-dimethylcyclopentyl, 1,3-dimethylcyclopentyl, methylcyclohexyl, dimethylcyclohexyl, and some heptyl and octyl hydroperoxides. In general, however, the process in accordance with this invention may be carried out in the presence of any tertiary hydroperoxide having more than 5 carbon atoms, but preferably between 6 and 30 carbon atoms, and most desirably between 7 and 15 carbon atoms. The tertiary hydroperoxides may be given the general formula of ROOH, in which R may be any hydrocarbon radical containing a tertiary carbon atom to which is attached the hydroperoxy (—OOH) group. R may be, for example, a saturated aliphatic hydrocarbon radical containing a tertiary carbon atom such as the triethylmethyl radical in triethylmethyl hydroperoxide, a cycloaliphatic hydrocarbon radical such as the 1,3-dimethylcyclopentyl radical in 1,3-dimethylcyclopentyl 1-hydroperoxide, or an aralkyl radical such as the $\alpha,\alpha$-dimethylbenzyl radical in $\alpha,\alpha$-dimethylbenzyl hydroperoxide. From the standpoint of commercial availability those hydroperoxides similar to $\alpha,\alpha$-dimethylbenzyl hydroperoxide are particularly useful. The latter is illustrative of the general class of hydroperoxides known as $\alpha,\alpha$-dialkylarylmethyl, or aryl(dialkyl)methyl, hydroperoxides.

The $\alpha,\alpha$-dialkylarylmethyl hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the aqueous alkali may be between about 1 and about 35% although it is preferable to use concentrations of about 2 to about 8%. Vigorous agitation is desirable during the oxidation reaction.

As illustrative of the alkyl-substituted aromatic organic compounds which may be oxidized, p-cymene, cumene, diisopropylbenzene, and sec-butylbenzene may be mentioned. These compounds lead to $\alpha,\alpha$-dimethyl-p-methylbenzyl, $\alpha,\alpha$-dimethylbenzyl, $\alpha,\alpha$-dimethyl-p-isopropylbenzyl, and $\alpha,\alpha$-ethylmethylbenzyl hydroperoxides, respectively. The aryl and alkaryl groups need not be derived from benzene, as is the case in the afore-mentioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl and the like, the same alkyl groups also being representative of $R_1$ and $R_2$ in the structural formula. $R_1$ and $R_2$ may be either the same or different.

The amount of hydroperoxide which may be used in accordance with this invention may be from about 0.2 to about 5.0% based on the monomers, a desirable range being from about 0.3 to about 2.0%, and the preferable amount of hydroperoxide on this basis being from about 0.4 to about 1.0%.

As shown by the examples the polymerizations are carried out in the presence of an activator comprising a water-soluble heavy metal salt and an $\alpha$-hydroxycarbonyl compound such as a reducing sugar. The combination of the water-soluble heavy metal salt and an $\alpha$-hydroxycarbonyl compound constitutes what is known as a redox system, which is so called because of its property of catalyzing oxidation-reduction reactions. The usual redox system usually comprises a salt of a heavy metal such as iron, cobalt, nickel, copper, silver, zinc, cadmium, mercury, chromium, manganese, or molybdenum associated with a complex-forming compound such as a pyrophosphate, oxalate, citrate, tartrate or salicylate. The usual redox system therefore comprises essentially a heavy metal complex wherein the metal is united to another element through coordinate covalences rather than by primary valences.

The redox system of this invention, however, also includes an α-hydroxycarbonyl compound or a compound behaving as an α-hydroxycarbonyl compound. Illustrative of these compounds have been those shown by the examples; namely, fructose, glucose, lactose, acetylacetone and ascorbic acid, but additional operable compounds include acetoin, propionoin, butyroin, isobutyroin, pivaloin and the like. In general, those aldehydes and ketones containing a hydroxyl group on an adjacent carbon atom in an alkyl chain, and having thereby in common the structural group

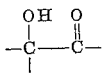

are operable in the process of this invention, but the preferable α-hydroxy aldehydes and ketones are found in the class of polyhydroxy aldehydes and ketones known as reducing sugars.

Exemplary of the reducing sugars which may be used in accordance with this invention are the monosaccharides, including aldotrioses such as glycerose; ketotrioses such as dioxyacetone; aldotetroses such as erythrose and threose; ketotetroses such as erythrulose; aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; and other reducing sugars including the disaccharides and trisaccharides such as maltose, lactose and mannotriose. Also operable is the equimolecular mixture of fructose and glucose obtained through the hydrolysis of sucrose and known as invert sugar.

In the redox system used in accordance with this invention the preferable water-soluble heavy metal salt is one derived from either ferric or ferrous iron. Based on the monomers the amount of heavy metal salt may be from about 0.0003 to about 1.0%, a highly useful range being from about 0.0003 to about 0.35%, and the preferable range being from about 0.01 to about 0.1%. Likewise, the preferable reducing sugars are the keto sugars; particularly suitable is fructose. As illustrative of the α-hydroxycarbonyl compounds in general, the amount of the reducing sugar based on the monomers may be from about 0.025 to about 4%, a preferable range on this basis being from about 0.2 to about 1%. Particularly applicable is an amount of sugar based on the monomer of 0.5%.

Compounds which may be advantageously polymerized in aqueous emulsion by means of the process of this invention include the conjugated butadienes such as butadiene-1,3, isoprene, 2,3-dimethyl butadiene-1,3, chloroprene, piperylene, monomer mixtures of two or more of these butadienes such as a mixture of butadiene-1,3 and 2,3-dimethyl butadiene-1,3, and monomer mixtures of one or more of these conjugated butadienes with vinyl compounds such as styrene, p-chlorostyrene, p-methoxystyrene, vinyl naphthalene, acrylic acid, acrylonitrile, methacrylonitrile, methyl acrylate, methyl methacrylate, methyl vinyl ketone, methyl isopropenyl ketone, and the like. The process of this invention has been found to be particularly applicable in the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, polyvinyl pyridine, and the various other addition polymers which may be prepared by the emulsion technique. It is desirable, particularly in the polymerization of those compounds leading to synthetic rubberlike materials, that there be included in the polymerization reaction mixture a mercaptan modifier. The amount of modifier which may be utilized may be that conventionally used in such polymerizations. It is desirable, however, that the mercaptan modifier be a tertiary mercaptan since, although primary mercaptans, for example, give polymerization rates comparable to those obtained with a tertiary mercaptan, the latter give improved modification of the synthetic polymers.

The polymerizations may generally be carried out under the same reaction conditions known in the art for emulsion polymerization, for example, concentration of reactants, temperature, pressure and the like. The temperature of the reaction may be varied from about 15° to about 100° C., although the preferable range from the standpoint of reaction rate is from about 40° to about 60° C.

The process in accordance with this invention, using as emulsifying agents the alkali metal salts of $C_{20}H_{30}O_2$ rosin acids, permits the attainment of high yields in satisfactory reaction times. Actually, it is possible utilizing the process in accordance with this invention to obtain high yields of polymers in about one-half the reaction time involved in obtaining comparable yields of polymers using some of the polymerization systems previously known to the art, for example, that using fatty acid soaps as emulsifying agents and potassium persulfate as the catalyst. The process of this invention is particularly advantageous in that it permits utilization as emulsifying agents materials which are economical and which impart to the resulting polymers desirable physical characteristics. In the preparation of rubberlike polymers, for example, the retention within the polymers of the natural rosin materials as a result of their coprecipitation with the polymers during the step of coagulating the emulsion results in polymers which have improved physical characteristics such as tack.

What I claim and desire to protect by Letters Patent is:

1. The process which comprises polymerizing in aqueous emulsion an organic compound which contains the $CH_2=C<$ group in the presence of a catalyst comprising a tertiary organic hydroperoxide having between 7 and 15 carbon atoms, an activator comprising a water-soluble heavy metal salt and an α-hydroxycarbonyl compound, and an emulsifying agent comprising an alkali metal salt of a $C_{20}H_{30}O_2$ rosin acid.

2. The process which comprises polymerizing in aqueous emulsion an organic compound which contains the $CH_2=C<$ group in the presence of a catalyst comprising a tertiary organic hydroperoxide having between 7 and 15 carbon atoms, an activator comprising a water-soluble heavy metal salt and a reducing sugar, and an emulsifying agent comprising an alkali metal salt of a $C_{20}H_{30}O_2$ rosin acid.

3. The process which comprises polymerizing in aqueous emulsion an organic compound which contains the $CH_2=C<$ group in the presence of a catalyst comprising an α,α-dialkylarylmethyl hydroperoxide having not more than 15 carbon atoms, an activator comprising a water-soluble heavy metal salt and a reducing sugar, and an emulsifying agent comprising an alkali metal salt of a $C_{20}H_{30}O_2$ rosin acid.

4. The process which comprises polymerizing in aqueous emulsion an organic compound which contains the $CH_2=C<$ group in the presence of a catalyst comprising α,α-dimethylbenzyl hydroperoxide, an activator comprising a water-soluble heavy metal salt and a reducing sugar, and an emulsifying agent comprising an alkali metal salt of a $C_{20}H_{30}O_2$ rosin acid.

5. The process which comprises polymerizing in aqueous emulsion an organic compound which contains the $CH_2=C<$ group in the presence of a catalyst comprising α,α-dimethylbenzyl hydroperoxide, an activator comprising a water-soluble heavy metal salt and a monosaccharide, and an emulsifying agent comprising an alkali metal salt of a $C_{20}H_{30}O_2$ rosin acid.

6. The process which comprises polymerizing in aqueous emulsion an organic compound which contains the $CH_2=C<$ group in the presence of a catalyst comprising α,α-dimethylbenzyl hydroperoxide, an activator comprising a water-soluble heavy metal salt and a ketose, and an emulsifying agent comprising an alkali metal salt of a $C_{20}H_{30}O_2$ rosin acid.

7. The process which comprises polymerizing in aqueous emulsion an organic compound which contains the $CH_2=C<$ group in the presence of a catalyst comprising α,α-dimethylbenzyl hydroperoxide, an activator comprising a water-soluble heavy metal salt and a ketohexose, and an emulsifying agent comprising an alkali metal salt of a $C_{20}H_{30}O_2$ rosin acid.

8. The process which comprises polymerizing in aqueous emulsion an organic compound which contains the $CH_2=C<$ group in the presence of a catalyst comprising α,α-dimethylbenzyl hydroperoxide, an activator comprising a water-soluble heavy metal salt and fructose, and an emulsifying agent comprising an alkali metal salt of a $C_{20}H_{30}O_2$ rosin acid.

9. The process which comprises polymerizing in aqueous emulsion an organic compound which contains the $CH_2=C<$ group in the presence of a catalyst comprising α,α-dimethylbenzyl hydroperoxide, an activator comprising a water-soluble iron salt and fructose, and an emulsifying agent comprising an alkali metal salt of a $C_{20}H_{30}O_2$ rosin acid.

10. The process which comprises polymerizing in aqueous emulsion an organic compound which contains the $CH_2=C<$ group in the presence of a catalyst comprising a tertiary, alkyl-substituted naphthene hydroperoxide having between 7 and 15 carbon atoms, an activator comprising a water-soluble heavy metal salt and a reducing sugar, and an emulsifying agent comprising an alkali metal salt of a $C_{20}H_{30}O_2$ rosin acid.

11. The process which comprises polymerizing in aqueous emulsion an organic compound which contains the $CH_2=C<$ group in the presence of a catalyst comprising a mixture of tertiary, alkyl-substituted cyclopentyl hydroperoxides having between 7 and 15 carbon atoms and tertiary alkyl-substituted cyclohexyl hydroperoxides having between 7 and 15 carbon atoms, an activator comprising a water-soluble heavy metal salt and a reducing sugar, and an emulsifying agent comprising an alkali metal salt of a $C_{20}H_{30}O_2$ rosin acid.

12. The process which comprises polymerizing in aqueous emulsion an organic compound which contains the $CH_2=C<$ group in the presence of a catalyst comprising a mixture of dimethylcyclopentyl, methylcyclohexyl and dimethylcyclohexyl hydroperoxides, an activator comprising a water-soluble heavy metal salt and a reducing sugar, and an emulsifying agent comprising an alkali metal salt of a $C_{20}H_{30}O_2$ rosin acid.

13. The process which comprises polymerizing in aqueous emulsion an organic compound which contains the $CH_2=C<$ group in the presence of a catalyst comprising a mixture of dimethylcyclopentyl, methylcyclohexyl and dimethylcyclohexyl hydroperoxides, an activator comprising a water-soluble heavy metal salt and an aldohexose, and an emulsifying agent comprising an alkali metal salt of a $C_{20}H_{30}O_2$ rosin acid.

14. The process which comprises polymerizing in aqueous emulsion an organic compound which contains the $CH_2=C<$ group in the presence of a catalyst comprising a mixture of dimethylcyclopentyl, methylcyclohexyl and dimethylcyclohexyl hydroperoxides, an activator comprising a water-soluble heavy metal salt and glucose, and an emulsifying agent comprising an alkali metal salt of a $C_{20}H_{30}O_2$ rosin acid.

15. The process which comprises polymerizing in aqueous emulsion an organic compound which contains the $CH_2=C<$ group in the presence of a catalyst comprising a mixture of dimethylcyclopentyl, methylcyclohexyl and dimethylcyclohexyl hydroperoxides, an activator comprising a mixture of water-soluble iron and cobalt salts and glucose, and an emulsifying agent comprising an alkali metal salt of a $C_{20}H_{30}O_2$ rosin acid.

16. The process which comprises polymerizing in aqueous emulsion butadiene-1,3 in the presence of a catalyst comprising α,α-dimethylbenzyl hydroperoxide, an activator comprising a water-soluble iron salt and fructose, and an emulsifying agent comprising an alkali metal salt of a $C_{20}H_{30}O_2$ rosin acid.

17. The process which comprises copolymerizing in aqueous emulsion at least two organic compounds which contain the $CH_2=C<$ group in the presence of a catalyst comprising a tertiary organic hydroperoxide having between 7 and 15 carbon atoms, an activator comprising a water-soluble heavy metal salt and an α-hydroxycarbonyl compound, and an emulsifying agent comprising an alkali metal salt of a $C_{20}H_{30}O_2$ rosin acid.

18. The process which comprises copolymerizing in aqueous emulsion a mixture of butadiene-1,3 and styrene in the presence of a catalyst comprising a tertiary organic hydroperoxide having between 7 and 15 carbon atoms, an activator comprising a water-soluble heavy metal salt and a reducing sugar, and an emulsifying agent comprising an alkali metal salt of a $C_{20}H_{30}O_2$ rosin acid.

19. A process for copolymerizing butadiene-1,3 and styrene in aqueous emulsion in the presence of α,α-dimethylbenzyl hydroperoxide, a water-soluble iron salt, a reducing sugar, a mercaptan modifier, and a rosin soap emulsifying agent, until a rubbery copolymer is obtained.

20. A process which comprises polymerizing an organic monomeric material comprising an unsaturated organic compound containing a CH=C< group in aqueous emulsion in the presence of $\alpha,\alpha$-dimethylbenzyl hydroperoxide, an organic reducing agent selected from the group consisting of aldoses and ketoses, a water-soluble iron salt and a rosin soap emulsifying agent until a polymer of said monomeric material is obtained.

EDWIN J. VANDENBERG.

References Cited in the file of this patent

UNITED STATES PATENTS

| Number | Name | Date |
|---|---|---|
| 2,367,805 | Semple | Jan. 23, 1945 |
| 2,380,476 | Stewart | July 31, 1945 |
| 2,395,523 | Vaughn et al. | Feb. 26, 1946 |
| 2,400,041 | Dickey | May 7, 1946 |
| 2,403,758 | Rust et al. | July 9, 1946 |
| 2,430,590 | Stewart | Nov. 11, 1947 |
| 2,430,591 | Stewart | Nov. 11, 1947 |
| 2,450,451 | Schmerling | Oct. 5, 1948 |
| 2,476,936 | Whetstone | July 19, 1949 |